United States Patent [19]

Keel et al.

[11] Patent Number: 4,819,111

[45] Date of Patent: Apr. 4, 1989

[54] THIN FILM HEAD WITH REDUCED CROSS SECTION IN THE CORE FOR CAUSING MAGNETIC SATURATION IN THE LEADING LEG'S THROAT AREA

[75] Inventors: Beat G. Keel, Prior Lake, Minn.; Tuan P. Tran, Goleta, Calif.; Gene P. Bonnie, Bloomington; Edward L. Schwarz, Minneapolis, both of Minn.

[73] Assignee: Magnetic Peripheral Inc., Bloomington, Minn.

[21] Appl. No.: 902,359

[22] Filed: Aug. 29, 1986

[51] Int. Cl.⁴ .............................................. G11B 5/127
[52] U.S. Cl. ...................................... 360/125; 360/122
[58] Field of Search ............... 360/119, 123, 125, 126, 360/127

[56] References Cited

U.S. PATENT DOCUMENTS

| | | | |
|---|---|---|---|
| 4,190,872 | 2/1980 | Jones | 360/125 |
| 4,219,855 | 8/1980 | Jones | 360/125 |
| 4,241,367 | 12/1980 | Nomura et al. | 360/127 |
| 4,583,143 | 4/1986 | Tabei | 360/123 |
| 4,639,811 | 1/1987 | Diepero et al. | 360/125 |
| 4,651,248 | 3/1987 | Shiiki et al. | 360/126 X |
| 4,652,957 | 3/1987 | Schewe et al. | 360/127 X |
| 4,672,493 | 6/1987 | Schewe | 360/125 |
| 4,742,413 | 5/1988 | Schewe | 360/126 |

OTHER PUBLICATIONS

IBM Technical Disclosure Bulletin, vol. 16, No. 10, Mar., 1974, pp. 3134-5-Dual-Gap Length Magnetic Heads.

Primary Examiner—Robert S. Tupper
Assistant Examiner—Andrew L. Sniezek
Attorney, Agent, or Firm—Edward Schwarz; Joseph A. Genovese

[57] ABSTRACT

A thin film magnetic recording head has a flux path in which during writing magnetic saturation occurs in the throat section of the leading pole rather than in the trailing pole. This keeps the stray magnetic fields generated in the area where the saturation occurs during writing from distorting the just-recorded data pattern in the medium, since the leading pole is spaced sufficiently far from the data pattern as it is created adjacent the trailing pole. Preferably, this is accomplished by making a cross section area of the flux path in the leading pole throat section physically smaller than the minimum cross section area in the remainder of the leading pole or in the trailing pole and is throat section.

7 Claims, 2 Drawing Sheets

THIN FILM HEAD WITH REDUCED CROSS SECTION IN THE CORE FOR CAUSING MAGNETIC SATURATION IN THE LEADING LEG'S THROAT AREA

BACKGROUND OF THE INVENTION

Modern designs of recording heads for magnetic data recording employ thin film technology, where the various elements of the head are created by depositing a number of layers of insulators, magnetic materials and conductors in preselected patterns and with precisely determined relative positions with respect to each other. After fabrication, these heads occupy the trailing end surface of a flyer adjacent the flyer's air bearing surface. Such a head has a flux path comprising top and bottom legs in opposed relationship which form a flux gap adjacent the air bearing surface and which are joined in an area spaced from the flux gap. A winding passes between the legs and between the area where the legs are joined and the flux gap.

The typical head thus created has a flux path with a relatively wide cross section in the area adjacent the winding, which tapers uniformly to a throat section. The throat section can be considered to be the portion of the flux path where the width of each flux path leg is approximately constant and minimum, and the spacing between the legs is decreasing toward the gap. The gap can be defined as the part of the flux path where the width of the legs and their spacing from each other are both minimum. The pole tips form the end of each of the top and bottom legs and are flush with the air bearing surface. The flux gap is defined as the insulating material between the poles. The thickness of each leg is usually less in the neighborhood of the poles than elsewhere in the flux path.

In use, rapid, relative motion between the flyer and an adjacent recording medium surface aerodynamically suspends the flyer above the medium with the head at its flux gap in magnetic coupling relationship with the medium. Magnetic patterns representing data can thus be created in and read from the medium by use of the winding.

Because of the very small dimensions involved, it is not possible during fabrication of individual heads to control the relative dimensions of the patterns in the individual layers or the relative positions of the various layers to better than a few percent of the typical dimensions involved. Furthermore, in such an application, the magnetic materials comprising the flux path are deposited in very thin layers whose thickness and magnetic characteristics are difficult to control during fabrication. These variations can result in unpredictable writing (recording) performance which is not desirable. Designing the flux path so that it saturates somewhere other than at the pole tips during writing keeps the critical pole tip field gradients relatively predictable and substantially reduces this problem. Saturation in a thin film head flux path typically occurs in only one place, since the flux path cross-section normal to flux flow usually has but one minimum area at which saturation occurs, and flux which leaks from the path at this point does not typically reenter the path some other place. These heads frequently saturate in the trailing leg's throat section because thin film fabrication techniques do not easily allow a trailing pole to be wider than the leading pole beneath it, and thicknesses of the two legs are preferred to be nearly the same, so that pole tip lengths (measured perpendicular to the flyer end surface) are equal.

References deemed most pertinent for the invention to be described below are IBM Technical Disclosure Bulletin, Vol. 16, No. 10, March 1974, pp. 3134-5; and U.S. Pat. Nos. 4,241,367; 4,219,855; and 4,190,872.

BRIEF DESCRIPTION OF THE INVENTION

As is well known leakage flux increases dramatically where the magnetic flux path saturates. It has been determined that this leakage flux from the trailing leg's throat section during writing can cause distortion of the data recorded, say by phase shifting. We have discovered that the stray flux generated by saturation of the leading leg's throat section, on the other hand, does not cause distortion of the just-written data. Our solution to the problem of write distortion caused by trailing throat section saturation and consequent flux leakage is to take advantage of the characteristic of magnetic circuits of varying cross-sectional area to saturate at only one place by constructing the flux path so that saturation occurs only at the leading leg's throat section. Such a leading leg's throat section is apparently spaced sufficiently far from the pole tips to prevent its leakage flux from distorting the data.

The preferred way to cause saturation of this leading leg throat section is by forming it with a cross-sectional area less than any other minimum cross-sectional area. There are different ways to create this smaller cross section area. One is to form the leading throat section with a portion whose width is less than the remainder of the pole while keeping the remainder of the leading leg throat section and pole of constant thickness. Another way is to form the leading throat section with a portion whose thickness is less than the remainder of either throat section or pole. To reduce steps in the fabrication procedure, it is preferred that the lesser thickness be created by placing a void or aperture at the throat section in one of the two layers from which the leading leg is usually formed.

Accordingly, one purpose of this invention is to prevent distortion of the data written by a thin film head.

A second purpose is to cause a portion of the leading leg throat section in such a head to be the point where saturation always occurs during writing.

Another purpose is to create the point of saturation without adding extra steps in the fabrication process.

Other purposes of the invention will become apparent from the description which follows.

BRIEF DESCRIPTION OF THE DRAWINGS

FIG. 2b is a cross section view of the pole area of a thin film head incorporating the embodiment of the invention shown in FIG. 2a.

FIG. 3b is a cross section view of the pole area of a thin film head incorporating the embodiment of the invention shown in FIG. 3a.

DESCRIPTION OF THE PREFERRED EMBODIMENTS

Figure 1A:
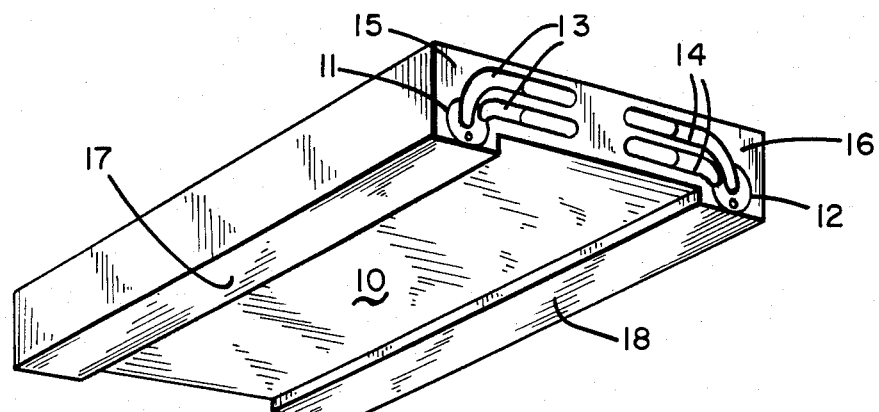
FIG. 1a shows a typical aerodynamic flyer on whose end surface a thin film head constructed according to the invention is carried.
Figure 1B:
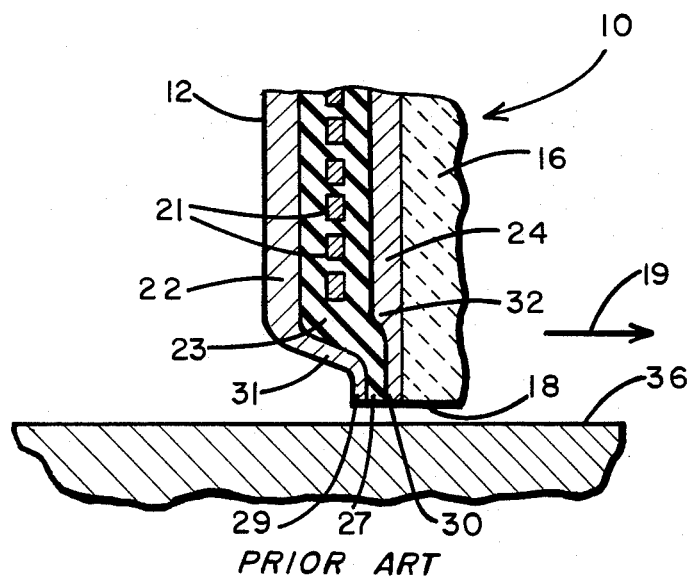
FIG. 1b is a cross section of a conventional thin film head, showing the flux path construction and spatial relationship of the various elements of the thin film head adjacent the poles.

FIG. 1a shows a prior art flyer 10 having a pair of air bearing surfaces 17 and 18 facing downwardly and by which the flyer 10 is aerodynamically supported when in use above and in close proximity to a recording medium surface such as is shown at 36 in FIG. 1b. The aerodynamic support is created by rapid movement of the flyer 10 relative to the recording surface as indicated by the arrow 19. Thus the end of the flyer 10 on which heads 11 and 12 are mounted as shown becomes the trailing end with respect to this relative motion. Conductors 13 and 14 are connected to the windings of heads 11 and 12 and provide a convenient means for attaching them to external electronics.

FIG. 1b shows a cross section normal to surfaces 16 and 18 of the flux path gap area of a conventional thin film head such as head 12 mounted on flyer end surface 16. This portion of a thin film head typically comprises a bottom leg 24 which is a magnetic material layer deposited directly on end surface 16. It is felt that the flux path should have a greater thickness at points away from the pole tips 29 and 30, so each leg of the flux path usually includes a second magnetic material layer which for leg 24 terminates in the vicinity of throat section 32. Layer 23 is made of a good electrical insulator and is non-magnetic, and lies directly on layer 24, extending to lie between and separate pole tips 29 and 30, thereby forming flux gap 27. Winding 21 is embedded in insulating layer 23 and is supported thereby, and to accomplish this in thin film construction, layer 23 is usually formed in two or more deposition steps, deposit of winding 21 occurring between these steps. Gap 27 interrupts flux flow from one leg to the other, forcing the flux to exit tips 29 and 30 into the adjacent medium 36.

The second leg 22 of the flux path lies on the non-magnetic layer 23 and also has a thickened portion which terminates in the vicinity of throat area 31. With reference to arrow 19 which indicates movement of head 12 and the flyer 10 which carries it relative to medium 36, it is convenient to refer to legs 22 and 24 and their respective throat sections 31 and 32 and pole tips 29 and 30 as respectively, trailing leg 22, trailing throat section 31, etc., and also to leading leg 24, etc.

The representative recording medium 36 is shown in FIG. 1b in section view in the typical position it will occupy adjacent head 12. If throat section 31 saturates, flux will leak from this area to the recording medium 36 adjacent. As arrow 19 indicates, the motion of head 12 causes this leakage flux to enter the recording medium 36 where data has been written during a write operation, and distort the magnetic pattern just created. During reading of course, no distortion occurs, because the high write currents and consequent high flux level are not present in the head winding.

Figure 2B:
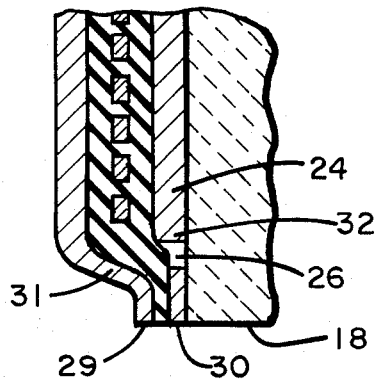
Figure 2A:
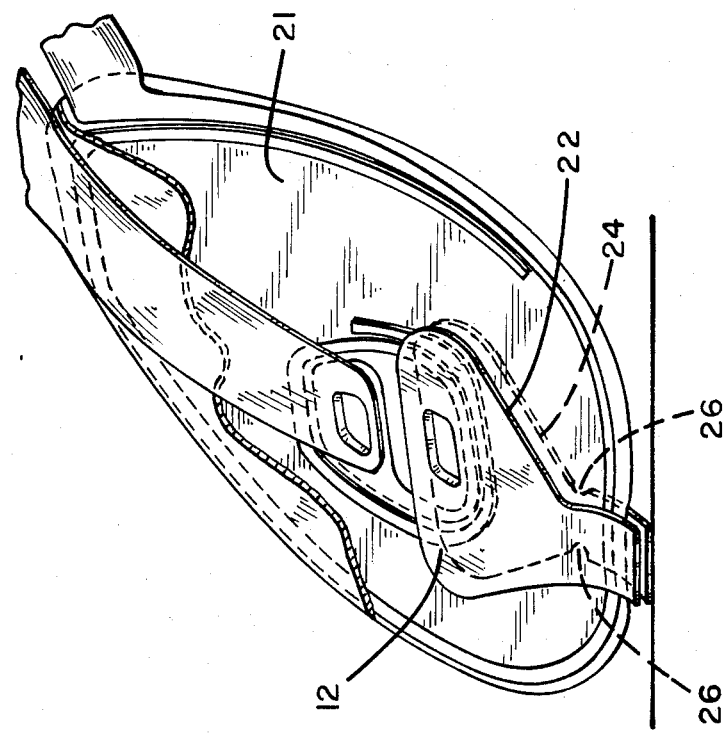
FIG. 2a is a perspective outline of a head incorporating a flux path displaying one embodiment of the invention.

The perspective view of an outline of the flux path shown in FIG. 2a shows one embodiment of a flux path incorporated in head 12 which avoids this problem. Legs 22 and 24 form the flux path as explained above. The invention is represented in FIG. 2a by the small notches 26 in throat section 24. Since the cross-sectional area normal to flux flow of leg 24 is by these notches 26 caused to be smaller at this point than for any other part of the flux path, when the flux path saturates, it must do so at this point. The cross-sectional area at notches 26 is preferably about 75-85% of the minimum cross-sectional area elsewhere.

FIG. 2b illustrates the invention in a cross section view identical to that of FIG. 1b and perpendicular to surfaces 16 and 18. The section is through notch 26 and shows its position in throat section 32. It is spaced from pole tips 29 and 30 and surface 18 so that leakage flux is directed away from the magnetic pattern created during writing. If trailing throat section 31 saturates, flux leakage caused thereby will enter the recording surface 36 adjacent and cause distortion of the magnetic pattern. But with notch 26 reducing the area of leading throat section 32, the saturation is forced to occur in the leading leg 24 where it causes little or no problem. It is preferable that notches 26 be placed 1 to 5 pole tip 30 thicknesses (measured parallel to the plane of the paper) from pole tip 30.

Figure 3B:
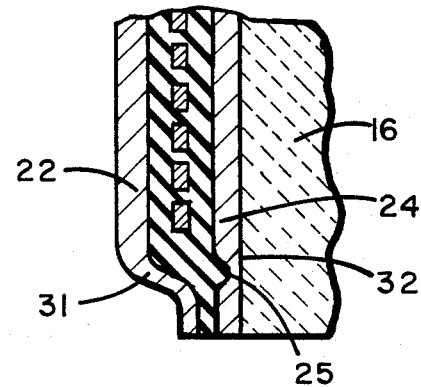
Figure 3A:
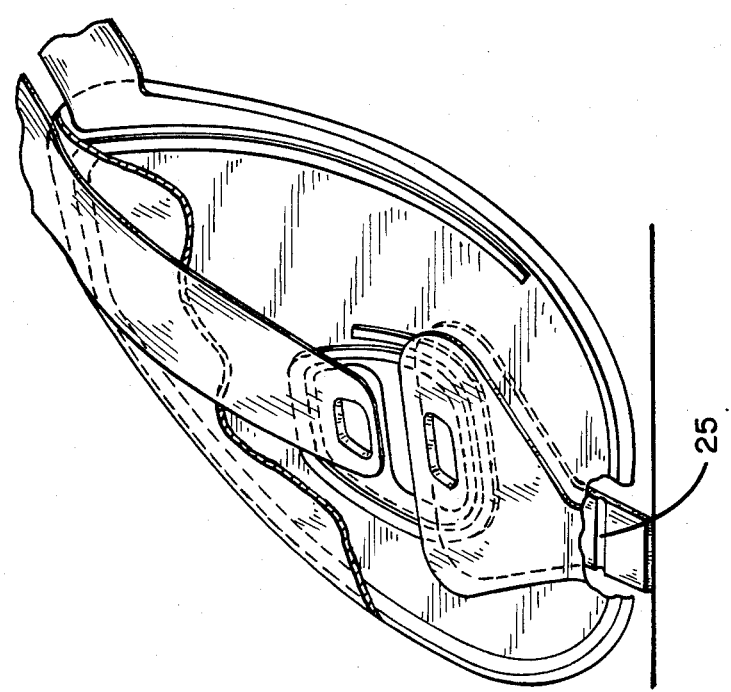
FIG. 3a is a perspective outline of a head incorporating a flux path displaying a second embodiment of the invention.

FIGS. 3a and 3b show a different embodiment of the invention. Leg 24 is created in two deposition steps, the second of which has a void in it which creates the groove 25 transverse to the direction of flux flow, reducing the cross-sectional area of the leading throat section 32 to less than any other cross section in the flux path by reducing its thickness, or dimension normal to the end surface 16 on which the head is carried. Groove 25 can be easily replace with an aperture to reduce the cross-sectional area of throat section 32. While the structure is somewhat different, the operation is identical to that of the head shown in FIGS. 2a and 2b, in that the saturation is caused to occur in the leading throat section 32 and kept from the trailing throat section 31, so that the adjacent, freshly written data is not distorted.

We claim:

1. A thin film magnetic recording head having a high permeability magnetic flux path and a flux gap in the flux path, for recording and reading data in the vicinity of the flux gap in the magnetic flux path of the head, said data encoded in magnetic patterns in a magnetic recording medium to be moved relative to the gap, said head of the type to be carried on the trailing end surface of a flyer with respect to the medium movement and suspended adjacent the medium with the flux gap in magnetic coupling relationship with the medium surface, said flux gap defined by leading and trailing poles at the ends of leading and trailing flux legs respectively which are mounted on the trailing end surface of the flyer and which form at least a part of the flux path, each flux leg having a throat section adjacent said flux gap, and each said pole having a tip at the end thereof and said head further having a winding encircling said flux path remotely from the flux gap by which winding, recording and reading of data is accomplished, wherein the invention comprises in the leading leg throat section adjacent the flux gap a minimum cross-sectional area smaller than any other cross-sectional area in the head's flux path, whereby magnetic saturation of the flux path is limited to this minimum cross-sectional area in the throat section of the leading leg to thereby prevent during recording magnetic saturation in the trailing leg throat section.

2. The magnetic recording head of claim 1, wherein the leading and trailing legs are comprised of similar materials.

3. The magnetic recording head of claim 2, wherein the minimum cross-sectional area of the leading leg comprises a portion of the leading leg throat section whose width is less than the width of the remainder of the flux path.

4. The magnetic recording head of claim 3 wherein the minimum cross-sectional area is spaced 1 to 5 thicknesses of the leading pole, from the leading pole's tip.

5. The magnetic recording head of claim 2, wherein the minimum cross-sectional area of the leading pole comprises a portion of the leading pole whose dimension normal to the end surface of the flyer on which the head is carried, is less than the width of the remainder of the flux path.

6. The magnetic recording head of claim 2 wherein the minimum cross-sectional area is spaced 1 to 5 thicknesses of the leading pole, from the leading pole's tip.

7. The magnetic recording head of claim 1 wherein the minimum cross-sectional area in the leading leg is about 75–85% of the minimum cross-sectional area elsewhere in the head's flux path.

* * * * *